United States Patent
Allen, Jr. et al.

(10) Patent No.: US 8,028,257 B2
(45) Date of Patent: Sep. 27, 2011

(54) STRUCTURE FOR DATA BUS BANDWIDTH SCHEDULING IN AN FBDIMM MEMORY SYSTEM OPERATING IN VARIABLE LATENCY MODE

(75) Inventors: James J. Allen, Jr., Raleigh, NC (US);
Steven K. Jenkins, Raleigh, NC (US);
Michael R. Trombley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 12/110,765

(22) Filed: Apr. 28, 2008

(65) Prior Publication Data
US 2008/0215783 A1 Sep. 4, 2008

Related U.S. Application Data

(63) Continuation-in-part of application No. 11/680,695, filed on Mar. 1, 2007, now Pat. No. 7,660,952.

(51) Int. Cl.
*G06F 17/50* (2006.01)
*G06F 12/06* (2006.01)
*G06F 13/00* (2006.01)

(52) U.S. Cl. ........ 716/106; 716/110; 716/111; 716/114; 716/117; 716/132; 716/136; 711/5; 711/158; 711/167

(58) Field of Classification Search .................. 716/1, 2, 716/4, 5, 6, 18; 711/5, 158, 167
See application file for complete search history.

(56) References Cited

U.S. PATENT DOCUMENTS

| | | | |
|---|---|---|---|
| 4,771,287 A | 9/1988 | Mims | |
| 5,455,934 A * | 10/1995 | Holland et al. | 711/4 |
| 5,623,685 A * | 4/1997 | Leedom et al. | 712/9 |
| 5,630,157 A * | 5/1997 | Dwyer | 712/23 |
| 5,742,784 A | 4/1998 | Potter et al. | |
| 5,765,204 A | 6/1998 | Bakke et al. | |
| 6,067,408 A | 5/2000 | Runaldue et al. | |
| 6,564,304 B1 | 5/2003 | Van Hook et al. | |
| 6,578,107 B1 | 6/2003 | Anderson et al. | |
| RE38,428 E | 2/2004 | Kelly et al. | |
| 6,732,242 B2 * | 5/2004 | Hill et al. | 711/158 |

(Continued)

OTHER PUBLICATIONS

Ganesh et al.; "Fully-Buffered DIMM Memory Architectures: Understanding Mechanisms, Overheads and Scaling "; Publication Year: 2007; High Performance Computer Architecture, 2007. HPCA 2007. IEEE 13th International Symposium on; pp. 109-120.*

(Continued)

*Primary Examiner* — Helen Rossoshek
(74) *Attorney, Agent, or Firm* — Patterson & Sheridan, LLP

(57) ABSTRACT

A design structure embodied in a machine readable storage medium for designing, manufacturing, and/or testing a design for scheduling the servicing of data requests, using the variable latency mode, in an FBDIMM memory sub-system is provided. A scheduling algorithm pre-computes return time data for data connected to DRAM buffer chips and stores the return time data in a table. The return time data is expressed as data return time binary vectors with one bit equal to "1" in each vector. For each received data request, the memory controller retrieves the appropriate return time vector. Additionally, the scheduling algorithm utilizes an updated history vector to determine whether the received request presents a conflict to the executing requests. By computing and utilizing a score for each request, the scheduling algorithm re-orders and schedules the execution of selected requests to preserve as much data bus bandwidth as possible, while avoiding conflict.

15 Claims, 7 Drawing Sheets

U.S. PATENT DOCUMENTS

| | | |
|---|---|---|
| 7,149,857 B2 * | 12/2006 | Jeddeloh ................ 711/158 |
| 7,337,293 B2 * | 2/2008 | Brittain et al. ............ 711/167 |
| 7,496,711 B2 * | 2/2009 | Bartley et al. ............ 711/117 |
| 7,506,140 B2 * | 3/2009 | Jensen .................... 712/218 |
| 2007/0038831 A1 * | 2/2007 | Kim et al. ................ 711/167 |
| 2007/0079057 A1 * | 4/2007 | Ruckerbauer et al. ...... 711/105 |
| 2007/0091104 A1 * | 4/2007 | Singh et al. .............. 345/531 |
| 2007/0101075 A1 * | 5/2007 | Jeddeloh ................ 711/158 |
| 2007/0282915 A1 | 12/2007 | Vosshall et al. |
| 2008/0177951 A1 * | 7/2008 | Bartley et al. ............ 711/119 |
| 2009/0103387 A1 * | 4/2009 | Shau .................... 365/230.02 |
| 2009/0103675 A1 * | 4/2009 | Yousefi .................. 375/376 |
| 2009/0138682 A1 * | 5/2009 | Capps et al. ............ 712/220 |
| 2009/0276559 A1 * | 11/2009 | Allen et al. ............... 711/5 |

OTHER PUBLICATIONS

U.S. Appl. No. 11/680,695, filed Mar. 1, 2007, entitled, "Data Bus Bandwidth Scheduling in an FBDIMM Memory System Operating in Variable Latency Mode."

* cited by examiner

STRUCTURE FOR DATA BUS BANDWIDTH SCHEDULING IN AN FBDIMM MEMORY SYSTEM OPERATING IN VARIABLE LATENCY MODE

CROSS-REFERENCE TO RELATED APPLICATION

This application is a continuation-in-part of U. S. patent application Ser. No. 11/680,695, filed Mar. 1, 2007 now U.S. Pat. No. 7,660,952, which is herein incorporated by reference.

BACKGROUND OF THE INVENTION

1. Technical Field

The present invention generally relates to design structures, and more specifically, design structures for computer memory systems and in particular to accessing data in computer memory systems. Still more particularly, the present invention relates to scheduling access to memory data within computer memory systems.

2. Description of the Related Art

In a data processing system, requests for data stored within memory (memory data) are received by a memory controller, which controls access to the memory data. In a Fully Buffered Dual Inline Memory Module (FBDIMM) memory subsystem, when a particular data item is requested through the memory controller, a command packet is sent (via serial signaling) down a chain of buffer modules until the packet reaches a buffer chip that is connected to the Dynamic Random Access Memory (DRAM) chips containing the requested data.

The buffer modules are often interconnected via a parallel Double Data Rate (DDR)-based interface. The buffer chip uses the DRAM protocol to access the data. The buffer is referred to as an AMB (advanced memory buffer). The AMB is designed to only take action in response to memory controller commands. The AMB delivers DRAM commands from the memory controller over the FBDIMM interface without any alteration to the DRAM devices over the parallel DDR-based interface.

DRAM chips are very high volume parts with many speed grades available at various costs. The time delay (i.e., the latency) at the memory controller to receive the data from the DRAM chips depends on the speed rating/grade of the parts. Also, another component of the time delay seen by the memory controller is the time taken for the command packet to reach the destination buffer chip and for that buffer chip to send the requested data once the buffer chip has obtained the data from the DRAM chips.

With FBDIMM technology, the signaling interface between the memory controller and the DRAM chips is split into two independent signaling interfaces, with a buffer between the two interfaces. The first interface between the buffer and DRAM chips supports DDR2 (DDR2 is the second (2) generation DDR interface standard, where DDR is a type of synchronous dynamic random access memory (SDRAM) memory access). However, the second interface between the memory controller and the buffer is a point-to-point serial interface.

Double-Data-Rate Synchronous Dynamic Random Access Memory (DDR SDRAM) achieves greater bandwidth than the preceding technology, single-data-rate (SDR) SDRAM, by transferring data on both the rising and falling edges of the clock signal. The greater bandwidth nearly doubles the transfer rate, without increasing the frequency of the front side bus. Thus a 100 MHz DDR system has an effective clock rate of 200 MHz when compared to equivalent SDR SDRAM. With data being transferred 8 bytes at a time, DDR RAM gives a transfer rate of (memory bus clock rate)×2 (for dual rate)×8 (number of bytes transferred). Thus with a bus frequency of 100 MHz, DDR-SDRAM gives a maximum transfer rate of 1600 Megabytes per second (MB/s) (i.e., DDR 1600 speeds).

Since the FBDIMM interface is based on serial differential signaling (similar to Serial Advanced Technology Attachment (ATA), Serial Small Computer System Interface (SCSI), Peripheral Computer Interconnect (PCI) Express, and others), a memory controller is capable of supporting multiple generations of FBDIMM technology-based components. FBDIMM technology, which is a new memory architecture, addresses the scaling needs of both capacity and bandwidth and enables memory to keep pace with processor and I/O improvements in enterprise platforms.

In an FBDIMM memory subsystem, there are two possible latency modes, fixed and variable. In the fixed latency mode, the buffer chips hold data when the buffer chips are near to the memory controller. The buffer chips also hold data when the DRAMs to which the buffer chips are attached are faster than the other buffer chips in the chain. The buffer chips hold data in order to make the total delay, as seen by the memory controller, the same for all data. The advantage of using a constant total delay is that the constant total delay greatly simplifies the design of the memory controller. However, the disadvantage is that all memory requests are delayed to match the delay of the slowest or farthest DRAM. Variable latency, in contrast, allows each buffer chip to return data as soon as possible. The benefit is, of course, that every data item is accessed in the minimum possible time. However, the drawback is that since all return data must pass through the same chain of buffer chips, a burden is placed on the memory controller to time the requests in a manner that avoids bus conflicts when returning data from different DRAMs.

SUMMARY OF THE INVENTION

Disclosed is a method and system for efficiently scheduling servicing of data requests in a Fully Buffered Dual Inline Memory Module (FBDIMM) memory sub-system, using the variable latency mode. High speed integrated circuitry embodies a scheduling algorithm which pre-computes return time parameters for Dynamic Random Access Memory (DRAM) data connected (via a parallel Double Data Rate (DDR)-based interface) to a plurality of buffer chips. The return time parameters are a compilation of all possible values for the time interval between sending a command packet from the memory controller to retrieve data from the various memory locations and receiving the requested data at the memory controller. Each possible value of the time interval is expressed as a binary vector, with one bit "on" (i.e., set to "1"). The algorithm stores the set of return time vectors in a table, for use by the memory controller when a memory access request is received.

In one embodiment, a design structure embodied in a machine readable storage medium for at least one of designing, manufacturing, and testing a design is provided. The design generally includes a memory subsystem having a plurality of buffer chips with different access latencies associated with retrieving memory data from memory components associated with the buffer chips. The design further includes a memory controller associated with the memory subsystem. The memory controller generally includes logic for retrieving a return time vector for a received data request from a table of return time information, and logic for deterministically selecting a next request to schedule to begin executing at a next scheduling cycle based on a data return time vector for that next request compared with a history vector of currently executing requests, wherein said next request is a request that does not provide a data bus conflict with the currently executing requests and which results in maximum usage of data bus bandwidth between the buffer chips and the memory controller.

In another embodiment, a design structure embodied in a machine readable storage medium for at least one of designing, manufacturing, and testing a design is provided. The design generally includes a data processing system that includes a processing component that generates data requests and issues the data requests for a return of data, a memory subsystem coupled to the processing component, said memory subsystem having a plurality of buffer chips with different access latencies associated with retrieving memory data from memory components associated with the buffer chips, and a memory controller associated with the memory subsystem. The memory controller may have logic for pre-computing a table of return time information for memory data stored within a memory component of respective ones of the plurality of buffer chips, logic for calculating the return time information in a unit of time, logic for expressing the return time information as a plurality of binary return time vectors with a single bit turned on having a bit value of "1", and logic for storing the first plurality of data return time vectors in a table of return time information, logic for retrieving a data return time vector for a received data request from the table of return time information, and logic for deterministically selecting a next request to schedule to begin executing at a next scheduling cycle based on a data return time vector for that next request compared with a history vector of currently executing requests, wherein said next request is a request that does not provide a data bus conflict with the currently executing requests and which results in maximum usage of data bas bandwidth between the buffer chips and the memory controller.

For each data request received, the memory controller retrieves the appropriate return time vector by using an index associated with the memory address of the requested DRAM data (within a DRAM connected to a particular buffer). The scheduling algorithm also maintains a history vector representing a compilation (by logical OR operations) of return time vectors of all currently executing requests. The return time vector for each received request (i.e., requests that are awaiting execution) is compared (by logical AND operation) with the history vector to determine whether the received request presents a bus conflict to the already executing requests. In one embodiment, a bus conflict is identified by the presence of any "1" bits in the resulting vector following the AND operation.

The scheduling algorithm computes a score which indicates, relative to the other requests, how well the scheduling of each of the waiting requests at the next scheduling cycle preserves bandwidth, given the scheduled return of data, as indicated by the history vector. By utilizing the score for each request, the scheduling algorithm re-orders and issues requests in an order to preserve as much data bus bandwidth as possible, while avoiding bus conflicts. When a request is issued (executed) by the memory controller, the scheduling algorithm updates the history vector to reflect the inclusion of the newly issued request in the set of executing requests.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
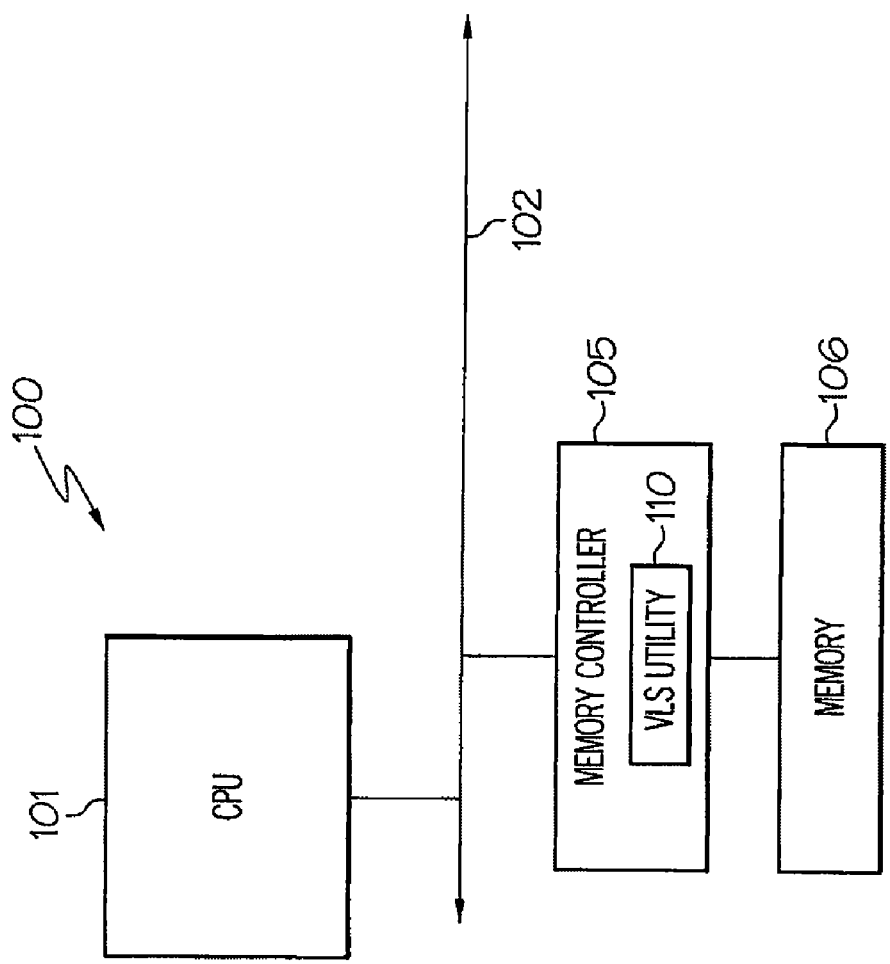
FIG. 1 illustrates a block diagram of a data processing system within which features of the invention may be advantageously implemented.

The present invention provides a method and system for efficiently scheduling servicing of data requests in a Fully Buffered Dual Inline Memory Module (FBDIMM) memory sub-system, using the variable latency mode. High speed integrated circuitry embodies a scheduling algorithm which pre-computes return time parameters for Dynamic Random Access Memory (DRAM) data connected (via a parallel Double Data Rate (DDR)-based interface) to a plurality of buffer chips. The return time parameters are a compilation of all possible values for the time interval between sending a command packet from the memory controller to retrieve data from the various memory locations and receiving the requested data at the memory controller. Each possible value of the time interval is expressed as a binary vector, with one bit "on" (i.e., set to "1"). The algorithm stores the set of return time vectors in a table, for use by the memory controller when a memory access request is received.

For each data request received, the memory controller retrieves the appropriate return time vector by using an index associated with the memory address of the requested DRAM data (within a DRAM connected to a particular buffer). The scheduling algorithm also maintains a history vector representing a compilation (by logical OR operations) of return time vectors of all currently executing requests. The return time vector for each received request (i.e., requests that are awaiting execution) is compared (by logical AND operation) with the history vector to determine whether the received request presents a bus conflict to the already executing requests. In one embodiment, a bus conflict is identified by the presence of any "1" bits in the resulting vector following the AND operation.

The scheduling algorithm computes a score which indicates, relative to the other requests, how well the scheduling of each of the waiting requests at the next scheduling cycle preserves bandwidth, given the scheduled return of data, as indicated by the history vector. By utilizing the score for each request, the scheduling algorithm re-orders and issues requests in an order to preserve as much data bus bandwidth as possible, while avoiding bus conflicts. When a request is issued (executed) by the memory controller, the scheduling algorithm updates the history vector to reflect the inclusion of the newly issued request in the set of executing requests.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

With reference now to the figures, FIG. 1 depicts a block diagram representation of a basic data processing system within which features of the invention may be advantageously implemented. DPS 100 comprises processor 101 connected to system bus/interconnect 102 and memory 106. Controlling access to memory 106 is memory controller 105, which is also connected to system bus/interconnect 102. Memory controller 105 comprises hardware and software logic that enables memory controller 105 to control access to (i.e., retrieval and storage of) memory data stored within memory 106.

Those of ordinary skill in the art will appreciate that the hardware and basic configuration depicted in FIG. 1 may vary. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as firmware code and/or logic within memory controller 105. Among the firmware code are code for providing serial signaling functionality between memory controller 105 and memory components, code for enabling the DRAM protocol connection to access memory data, and more specific to the invention, code for enabling the variable latency scheduling features described below. For simplicity, the collective body of code and logic that enables the variable latency scheduling features is referred to herein as variable latency scheduling utility. In actual implementation, the variable latency scheduling utility may be implemented in a memory subsystem operating in a variable latency mode to provide the variable latency scheduling functionality described below.

Thus, as shown by FIG. 1, in addition to the above described hardware components, memory controller 105 of data processing system 100 comprises one or more firmware components, including variable latency scheduling (VLS) utility 110. According to the illustrative embodiment, variable latency scheduling utility 110 enables memory controller 105 to complete a series of functional processes, including: (1) pre-computing latency associated with the retrieval of memory data, connected to all possible buffer chips; (2) maintaining a history vector which provides information about the scheduled return of data associated with currently executing requests; (3) retrieving a return time vector for a received data request from the (pre-computed) return time parameters; (4) determining which received request to schedule as a next executing request at the next scheduling cycle; and other features/functionality described below and illustrated by FIGS. 2-6.

Figure 2:
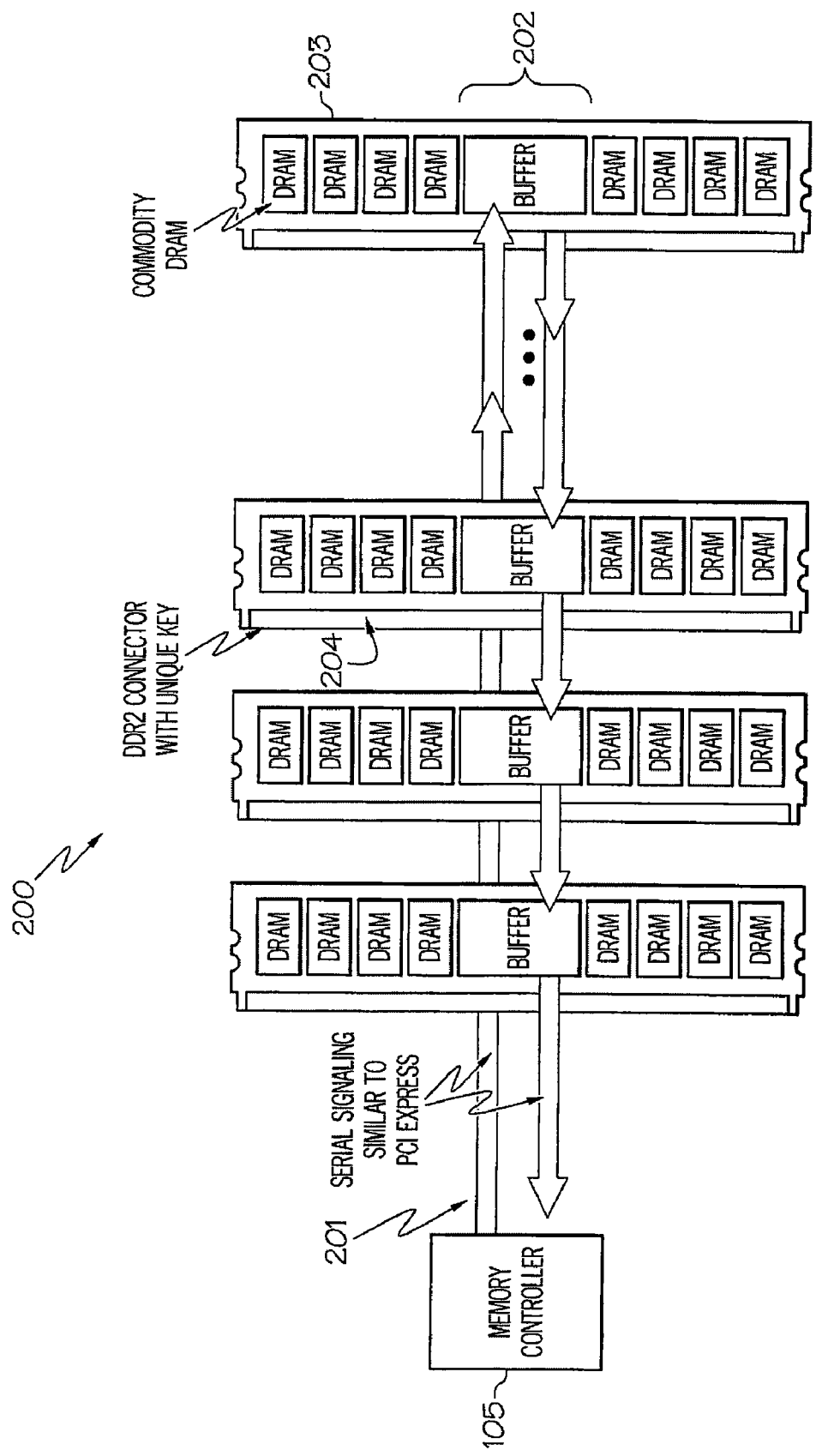
FIG. 2 illustrates an FBDIMM memory subsystem.

FIG. 2 illustrates an FBDIMM memory subsystem. Memory subsystem 200 comprises memory controller 105 connected to a chain of buffers illustrated as buffer set 202, via serial link 201. Memory subsystem 200 also comprises a number of Dynamic Random Access Memory banks 203, which are assumed to be FBDIMMs. The buffers within buffer set 202 are connected to the DRAM chips within the respective DRAM banks via a parallel Double Data Rate (DDR)-based interface, which is illustrated as DDR2 interface 204.

The FBDIMM technology directs signaling interface between memory controller 105 and the DRAM chips 203, and the interface is split into two independent signaling interfaces with a buffer, referred to as the AMB (advanced memory buffer), between the two interfaces. The parallel interface between the buffer and DRAM chips supports DDR2. However, the interface between the memory controller and the buffer is a point-to-point serial interface.

Memory subsystem 200 consists of several circuits which are carefully designed to embody a scheduling algorithm (within VLS utility 110 in memory controller 105 of FIG. 1) in a manner that is practical to implement in a very high speed integrated circuit chip. In optimizing the design of the scheduling algorithm, the performance benefits are maximized when special consideration is given to the following factors: (1) The number of logic gates; and (2) the length of interconnecting wires. These two (2) factors, which may vary according to the embedded technology, may also decrease the speed at which a circuit operates. Fortunately, the scheduling algorithm operates ideally (having factored the number of logic gates and the length of connecting wire into the design) in FBDIMM technology, when operating in variable latency mode at DDR1600 speeds. It is contemplated that a higher performance solution at a particular speed and in a particular circuit technology may be ideally achieved by a certain level of redesign (which also factors the number of logic gates and length of connecting wire).

Figure 3:
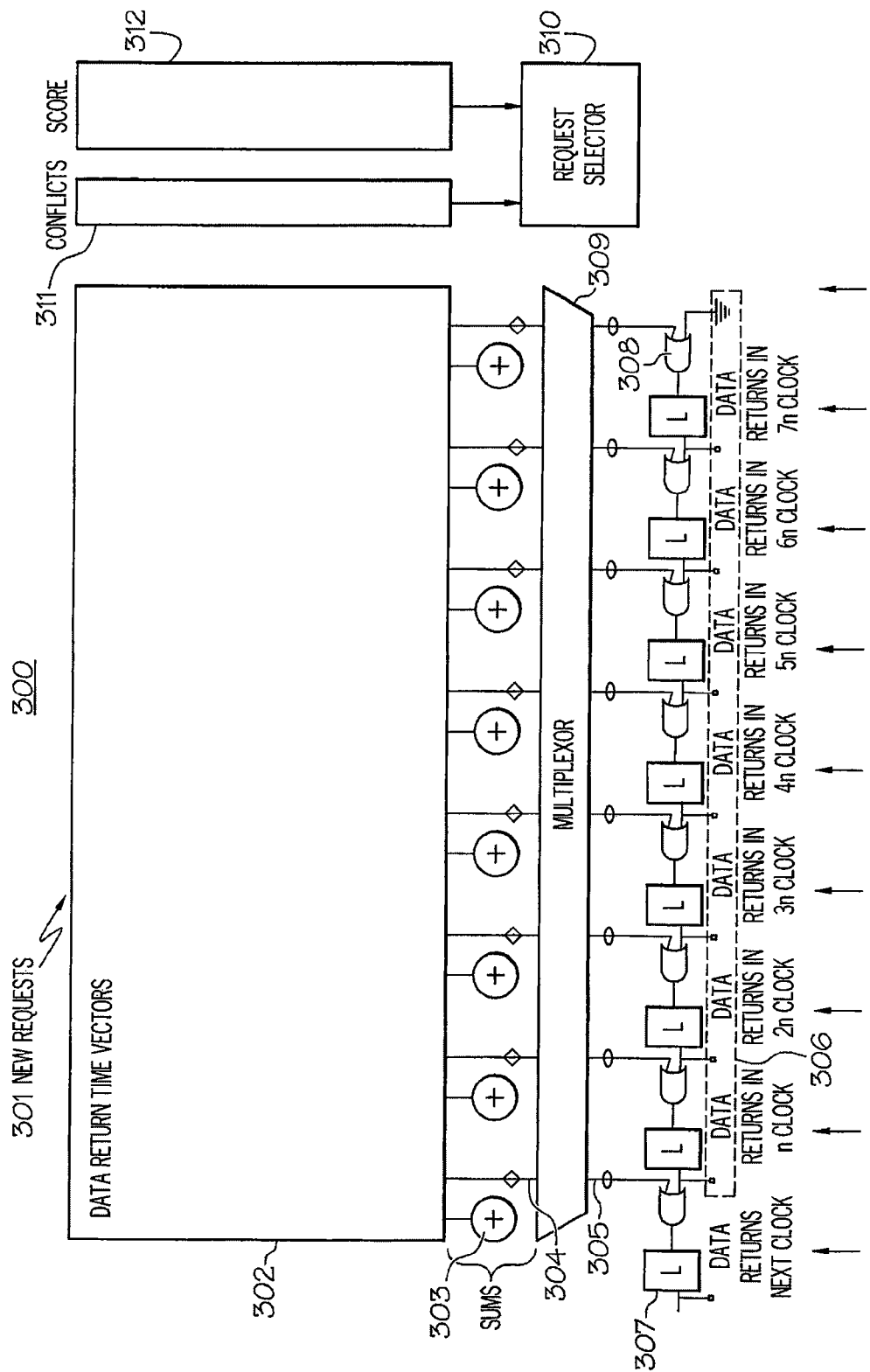
FIG. 3 illustrates a block diagram representation of the circuitry which implements the scheduling algorithm.

Memory subsystem 200 operates in the variable latency mode, which allows each buffer chip within buffer set 202 to return data in the minimum time possible. In order to avoid data bus conflicts and to execute requests as quickly and as efficiently as possible, a scheduling algorithm (which is illustrated in FIG. 3) implemented as VLS utility 110 within memory controller 105 (FIG. 1) is provided. During memory access operation, the scheduling algorithm pre-computes the latency information (i.e., the return time information) associated with all data requests and utilizes this latency information to determine the latency associated with each subsequent request for memory data. The number of buffer chips in buffer set 202 (i.e., a chain of buffers) indicates the number of the different latency values that are possible. Thus, a buffer set with eight buffers in the chain, for example, indicates that there are eight possible latency values.

The return time information (latency) for data connected to each buffer chip is expressed as a return time (binary) vector with only one bit turned on (equivalent to a binary "1" and referred to as a "1" bit). Therefore, a binary vector of eight single bit components, with only one "1" bit, may account for all of the eight possible values of the latency. Data requests with the smallest associated latency (e.g., requests targeting memory data in the buffer chip(s) that are closest to memory controller 105) have an associated return time vector in which the leftmost bit (the first component) of the vector is the "1" bit. Data requests with a maximum associated latency (i.e., requests targeting memory data in the buffer chip(s) that are farthest away from memory controller 105) have an associated return time vector in which the rightmost bit (e.g., the eighth component, given the eight buffer example) of the vector is the "1" bit.

Figure 4:
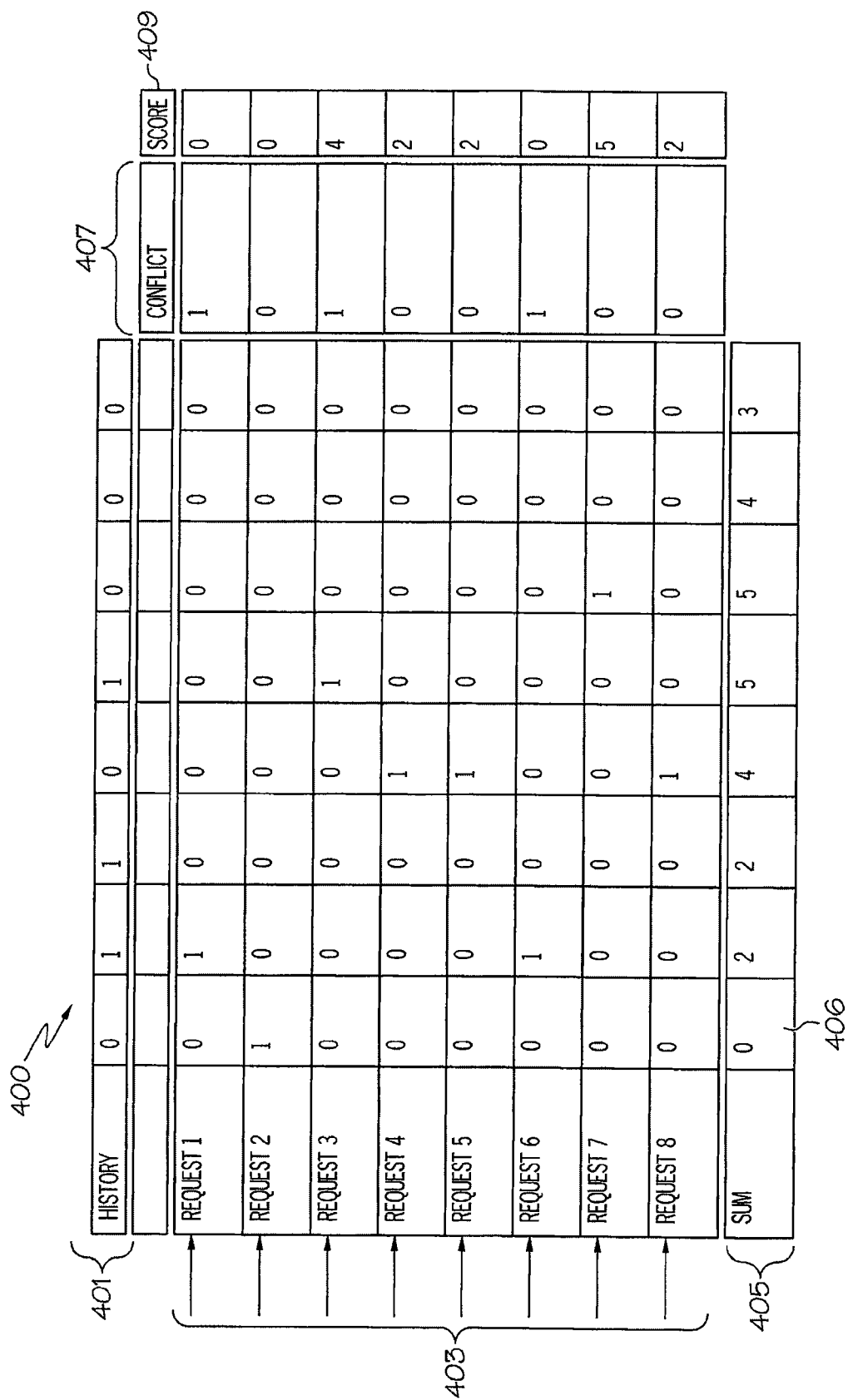
FIG. 4 illustrates a table of vectors used for the determination of bus conflicts and the computation of vector sums and scores for a set of received data requests, according to an illustrative embodiment of the present invention.

The scheduling algorithm uses these return time vectors to compile a history vector of requests selected for execution. The scheduling algorithm then uses this history vector to further determine the potential conflicts presented by subsequently received requests to the currently executing requests. In addition, the scheduling algorithm executes a "sums" and "scores" computation process (which are illustrated in FIG. 4) to select a "waiting" request to begin executing at the next cycle at which selected requests may be scheduled.

FIG. 3 illustrates a block diagram representation of the circuitry (or scheduling logic) that implements various functions of the scheduling algorithm. Scheduling logic 300 comprises a set of sequentially-ordered data return time vectors 302, which are looked-up/retrieved from a list of pre-computed values based on which DRAM contains the data for new requests 301 received at the memory controller 105 (FIG. 1). Scheduling logic 300 also comprises conflict indicator vector 311 and scores vector 312, which are connected to and provide control input for request selector 310. Both conflict indicator vector 311 and scores vector 312 contain parameter values corresponding to respective entries of the set of data return time vectors 302. Specific functionality of conflict indicator vector 311 and scores vector 312 is explained in greater detail below.

Request selector 310 provides a select input to multiplexor (MUX) 309, which is connected to data return time vectors 302. Also connected to data return time vectors 302 is a set of adders 303, which are utilized for providing the sums of the columns of entries for the return time vectors. Determination and use of resulting sums is described in further detail below within the description of the table of FIG. 4.

Scheduling logic 300 also comprises a series of AND logic (not shown) that are utilized to logically AND each return time vector with the current history vector. According to one embodiment, the results of the ANDing process are stored within respective entries of conflicts vector 311. The purpose for completing the logically ANDing of these data return time vectors with the history vector and deductions discerned from the resulting sum vector are explained with reference to FIG. 4, described below.

Within scheduling logic 200, MUX 309 receives vector entries as inputs via input lines, MUXin lines 304, coupled to data return time vectors 302, and MUX 309 provides selected vector entries as outputs via output lines, MUXout lines 305, which are each coupled to a first input of a set of logical OR gates 308. The second input of the set of OR gates 308 are connected to outputs of a series of latches 307. These latches contain the accumulation of the previous selections, which is referred to as the history vector (306).

Scheduling logic 300 further includes a history vector 306 which is a set of bits of equal number to the size of the data return time vectors 302. The history vector 306 is the latched output from the above ORing process with the leftmost bit shifted out of the vector and the rightmost bit set to zero via grounding. This vector (306) is determined by first selecting a particular data return time vector (from vectors 302) corresponding to a particular received request that is selected at MUX 309 by request selector 310. Once the particular data return time vector is selected, the vector entries are inputted to a set of OR gates 308 and are ORed with a previous set of entries of the current history vector, which are stored within the series of latches 307. The ORing of the selected data return time vector with the current history vector then generates the new history vector 306.

With scheduling logic 300, new requests 301 are received at memory controller 105. The return time vectors associated with the new requests 301 are placed in data return time vectors 302. Conflicts presented by the received requests to the executing requests are identified within conflict indicator vector 311. Adders (303) are utilized in the computation of the sums. The sums vector, the conflict vector 311, and the scores vector 312 are utilized to determine the "waiting" request that is the next scheduled request to begin executing. The history vector provides compiled return time information for data being requested by all of the currently executing requests.

Data may be returned in a multiple of "n" clock cycles, where n refers to the minimum number of clock cycles between successive returns of data at the memory controller. In the diagram and discussion, the value "n" is also proportional to the shortest interval between sending a command packet from the memory controller and receiving the associated data at the memory controller. This interval corresponds to the short delay associated with retrieving data connected to the buffer chips that are closest to the memory controller or retrieving data from the faster DRAMs. Depending on the time delays involved in the actual implementation, this first delay may be larger than the number of clock cycles between successive transfers. Since this delay is added to all accesses, the delay does not alter the algorithm. Request selector 310 triggers MUX 309 to forward (via the MUXout lines 305) the return time vector of the selected request to the respective first inputs of the OR gates 308. The history vector 306 (provided by the outputs of the latch set 307) further provides the other set of (second) inputs to the respective OR gates 300. In scheduling logic 300, the OR gates provide the logical OR operations for incorporating the return time vector for the selected request into the history vector 306. At the next scheduling clock cycle, the history vector 306 is updated with data from the MUXout lines 305 via the OR gates 308. During the updating of the history vector 306, the expired vector component (i.e., the leftmost bit) is removed from the history vector 306.

Turning now to FIG. 4, a table of vectors used for the determination of conflict and the computation of "sums" and "scores" for a set of received data requests is illustrated, according to an illustrative embodiment of the present invention. Table 400 comprises history vector 401 which is located in the first row of Table 400. In addition, Table 400 includes data return time vectors 403. Data return time vectors 403 correspond to the respective requests received at memory controller 105. Data return time vectors 403 are included in Table 400 (below the row containing history vector 401) in the order that the respective requests were received. Additionally, Table 400 includes conflict vector column 407, which has specific ones of the entries set to "1", indicating a conflict for first return time vector, third return time vector, and sixth return time vector. Table 400 also comprises sum vector 405, which is a row of sums corresponding to the various requests. Finally, Table 400 also comprises a scores vector column 409, illustrated as a separate, independent vector, which is the "last" or "rightmost" column depicted.

The scheduling algorithm determines the potential conflict presented by each received request if the received request begins executing following the next scheduling cycle. In Table 400, the components of return time vectors 403 that have a "1" bit in the same column as history vector 401, correspond to the respective received requests which present a conflict to the currently executing requests. The scheduling algorithm determines the conflict presented by a single request by performing a logical AND operation on history vector 401 and the return time vector (corresponding to the single request). The logical AND operation is repeated for each of the received requests. The corresponding resulting vector (from performing the logical AND operation) indicates a conflict if any "1" bits are present in the resulting vector. If there is conflict (as indicated by the presence of a "1" bit in the resulting vector), a corresponding conflict indicator in conflict vector column 407 (or conflict vector 311, FIG. 3) is set to "1".

In Table 400, conflict indicators for first return time vector, third return time vector and the sixth return time vector all demonstrate the presence of conflict with "1" bits placed in the appropriate position of conflict vector column 407. Thus, the first received request, the third received request and the sixth received request each present a conflict to the currently executing requests and, thus, none of these three requests are selected to begin executing at the next scheduling cycle.

The sums within sum vector 405 are computed as follows. The computation of the column sum for the first column starts with "0". For all columns besides the first column, the computation of a particular column sum starts with the column sum from the previous column. The previous column sum (or "0" for the first column) is then added to the number of "1" bits in the column for which the column sum is being computed. Then "1" is subtracted after adding the number of "1" bits as long as the value (after the addition of "1 bits) is not equal to "0". The sums are contained in sum vector 405. The sums give an indication of the clustering of requested time slots (including the already scheduled time slots) for data return.

By construction, the return time vector associated with each request has exactly one bit on, and the score for each request, which is stored in scores column 409, is (identified as) the column sum preceding the column in which the (return time) vector's only "1" bit is present. Requests with a "1" bit in the leftmost column have a score of "0" as long as these requests do not have a conflict. For example, the second received request has a score of "0" and is the request with the lowest score, and which does not present a conflict. Thus, in the example illustrated in Table 400, request 2 is the received request that is selected to begin executing at/during the next scheduling cycle. A particular request selection, using the scores criteria, is made to best reduce the clustering of requested time slots (i.e., to evenly distribute the servicing of the requests) to service requests more efficiently, while avoiding conflict.

The history vector and the collection of return time vectors (associated with the received requests) are all updated at each scheduling cycle. In particular, the scheduling algorithm begins to update history vector 401 by first incorporating the return time vector of the selected request (into history vector 401). The update is executed by a logical ORing of history vector 401 and the return time vector. The scheduling algorithm then removes the expired (first) vector component (bit) of history vector 401, at the scheduling cycle. This bit removal corresponds to a left (time) shift of history vector 401 in Table 400. Also, the set of data return time vectors below the selected return time vector is shifted upwards in Table 400, after removing the selected request and associated data return time vector from the set within Table 400. This upward shifting is provided to maintain the receiving order and to accept, in the order that requests are received, any new requests.

Figure 5:
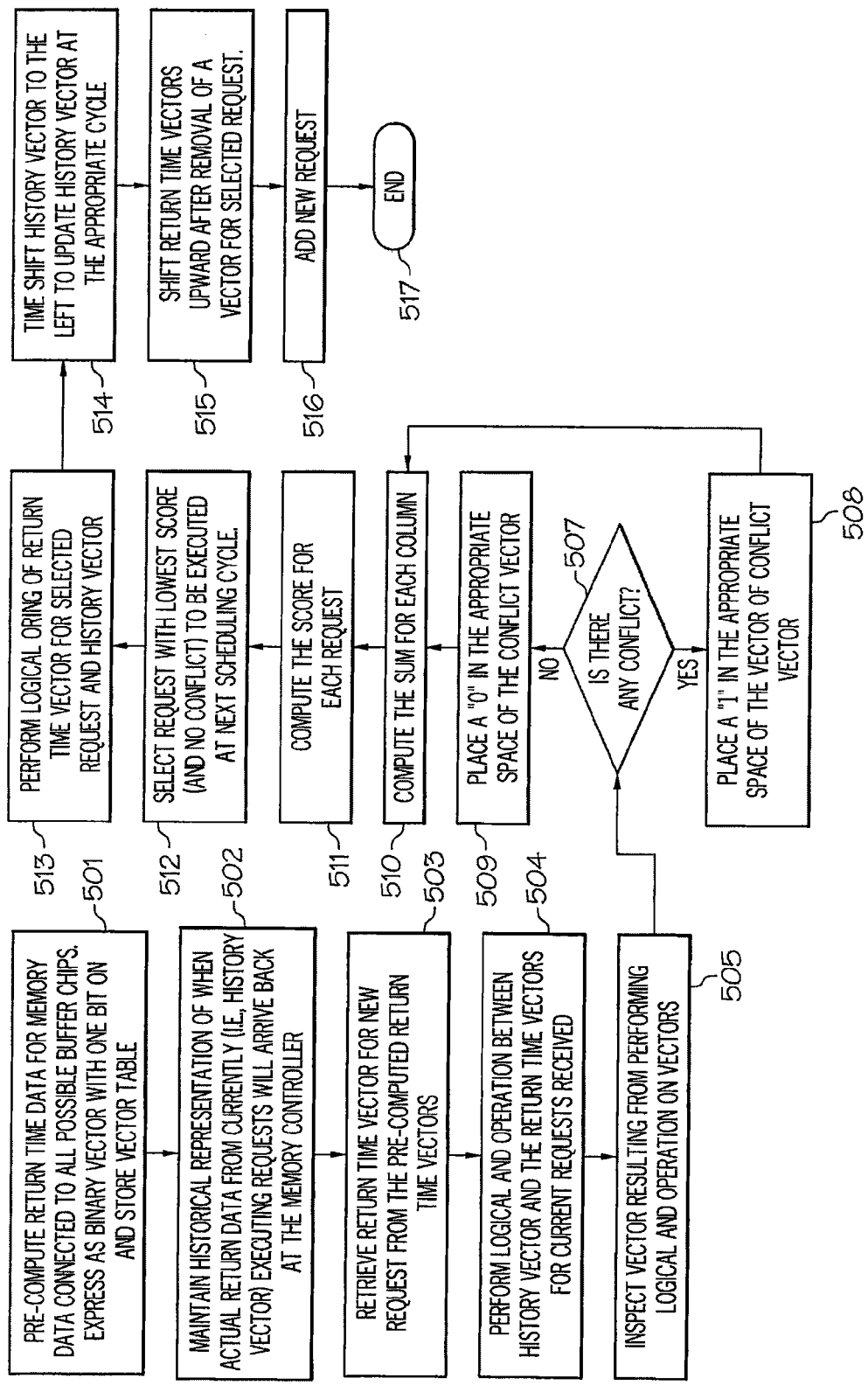
FIG. 5 is a flow chart which illustrates the process completed by the algorithm for reordering data requests in a memory system operating in the variable latency mode, according to an illustrative embodiment of the present invention.

FIG. 5 is a flow chart which illustrates the processes completed by the algorithm for reordering data requests and for avoiding conflicts in a memory subsystem operating in the variable latency mode, according to an illustrative embodiment of the present invention. The process begins at block 501, at which, high speed integrated circuitry embodying the scheduling algorithm pre-computes the return time data for data connected to all possible DRAM buffer chips. The return time information for data connected to each buffer chip is expressed as a binary vector with only one bit turned on (equivalent to a binary "1" and referred to as a "1" bit). When data may be returned in the minimum amount of time, the leftmost bit of the vector is the "1" bit and when the data is capable of making a return in the maximum amount of time, the rightmost bit of the vector is the "1" bit. The compiled set of binary return time vectors for data connected to all buffer chips may be referred to as a set/collection of return time vectors which are stored in a table that is accessed following receipt of each memory access request by the memory controller. At block 502, the scheduling algorithm maintains the history vector, which indicates the expected arrival time of data returning to the memory controller. In particular, the history vector is maintained in a chain of latches and is also expressed as a binary vector. If no memory requests are being executed, or if all prior requests have been completed, the history vector is a vector of zeros.

Any new request presented to the memory controller is associated with a data return time vector (retrieved from the pre-computed return time information), as shown in block 503. The memory controller maintains a list of multiple memory requests which have been issued to the memory controller by a microprocessor or other consumer of data. Each request has an associated data return time vector. These return time vectors are each intentionally expressed as a binary vector with only one bit turned on to align the return time vectors with the history vector by time scale. This alignment of time scales allows the history vector to be logically ANDed with the return time vector for a particular access request to determine if that request causes a conflict with the requests that have already been issued.

In order to begin the process for determining if a new request presents any scheduling conflict to the executing requests, circuitry embodying the algorithm performs a logical ANDing operation between each data return time vector (for each new request) and the history vector, as shown at block 504. At block 505, the resulting vector is inspected to determine if a zero vector was produced. At block 507, the algorithm determines whether there is a conflict (i.e., whether the logical ANDing operation resulted in a nonzero vector). If a conflict exists, then the algorithm confirms that the new request does present a conflict to the executing requests and places a "1" in the appropriate space of the conflict vector, as shown at block 508. If, at block 507, the algorithm determines that the result of the logical ANDing operation does not indicate existence of a conflict (i.e., the logical ANDing operation resulted in a zero vector), then a "0" is placed in the appropriate space of the conflict vector to indicate that the new request does not present a conflict to the executing requests, as shown at block 509.

At block 510, at which, the algorithm computes the sums for each column and, at block 511, the algorithm determines the score for each request. The algorithm then selects the requests having the lowest score (or the first received request among multiple requests having the same lowest score) that does not have a conflict, as shown at block 512. A tabular illustration of rows and columns for the computation of sums and scores is depicted in FIG. 4.

The sums and scores computation is used to efficiently service a higher number of requests in a shorter space of time by re-ordering the requests while "preserving" as much bandwidth as possible. Preserving bandwidth refers to the efficient use of available bandwidth, i.e., with minimal waste of bandwidth, while avoiding data bus conflicts. In order to attain the theoretical maximum limit of bandwidth usage, data returns every n cycles, i.e., data occupies every possible time slot on the bus. The re-ordering process (or requests) maximizes the ability to take advantage of every available opportunity or available time-slot for transmitting data between the memory controller and the buffer chips.

In order to account for the start of execution and to track the return time of the selected request, the algorithm performs a logical ORing operation between the data return time vector corresponding to the selected request and the history vector, at block 513. As shown at block 514, the history vector is updated at the scheduling cycle, in time for the next sums and scores computation. Additionally, as shown at block 515, all the data return time vectors below the selected request vector are shifted one table row upwards, after the selected vector is removed from the table. Shifting of the vectors within the table is necessary to update the vectors at the scheduling cycles. Any new vector/new request is be added to the end of the table/matrix of vectors/requests, as shown at block 516, and the process ends at block 517.

Figure 6:
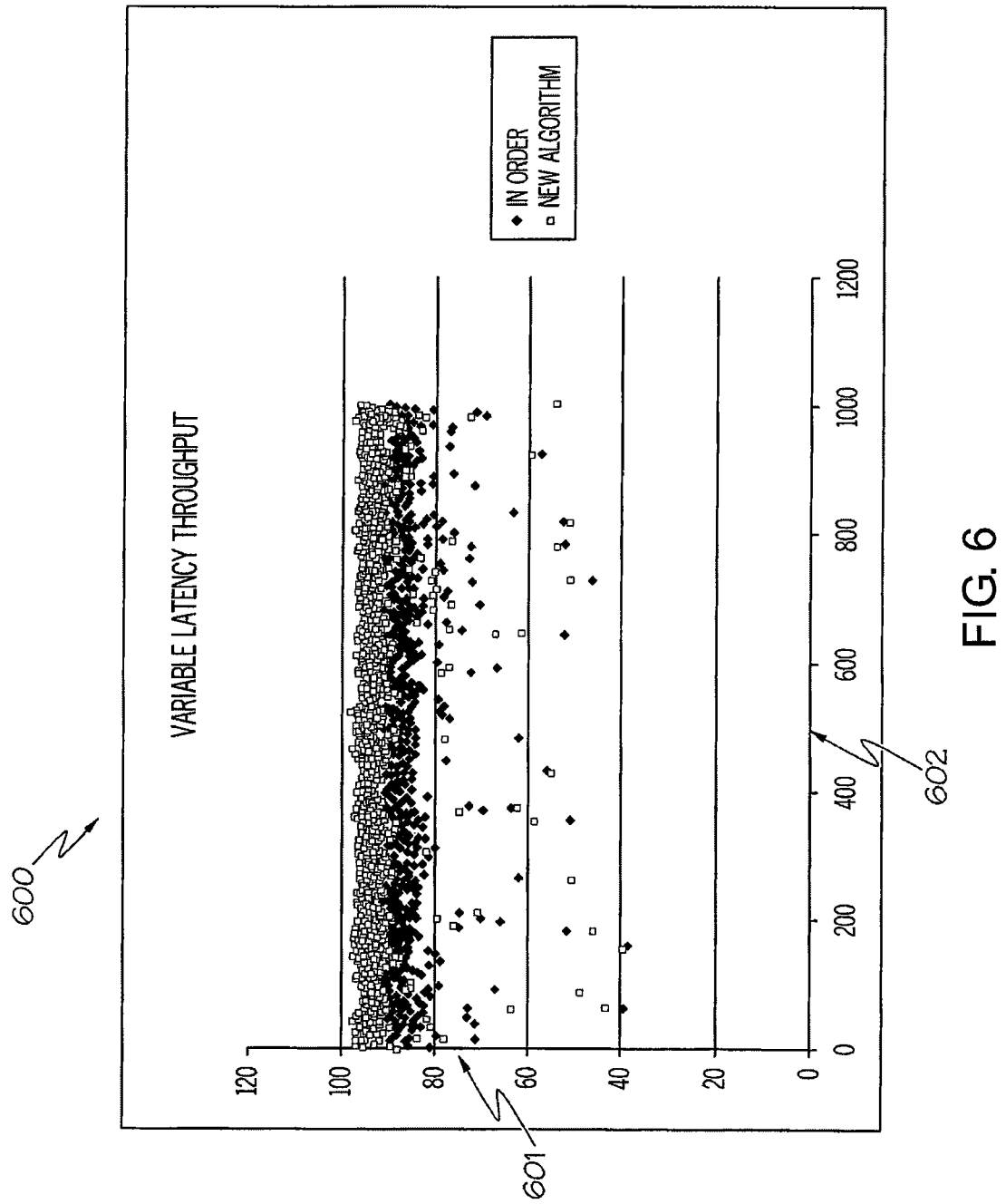
FIG. 6 is a graph showing the results of a test of the scheduling algorithm, according to an illustrative embodiment of the present invention.

FIG. 6 illustrates a graph showing the results of a C language program which was coded to test the scheduling algorithm, according to an illustrative embodiment of the present invention. Graph 600 comprises throughput axis 601, and configuration axis 602. Graph 600 depicts the throughput measured as a percentage of total possible bus bandwidth for both an in order request ordering versus the ordering produced by the scheduling algorithm for 1000 different memory configurations. Each experiment is run through 1000 random requests and the total throughput is measured. Each memory configuration consists of different speed grade DRAMs plugged into the FBDIMM channel in different orders. Across all of the experiments, an average gain in bus throughput is observed, and the new algorithm improves throughput in substantially all of the experiments.

In the flow chart (FIG. 5) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 7:
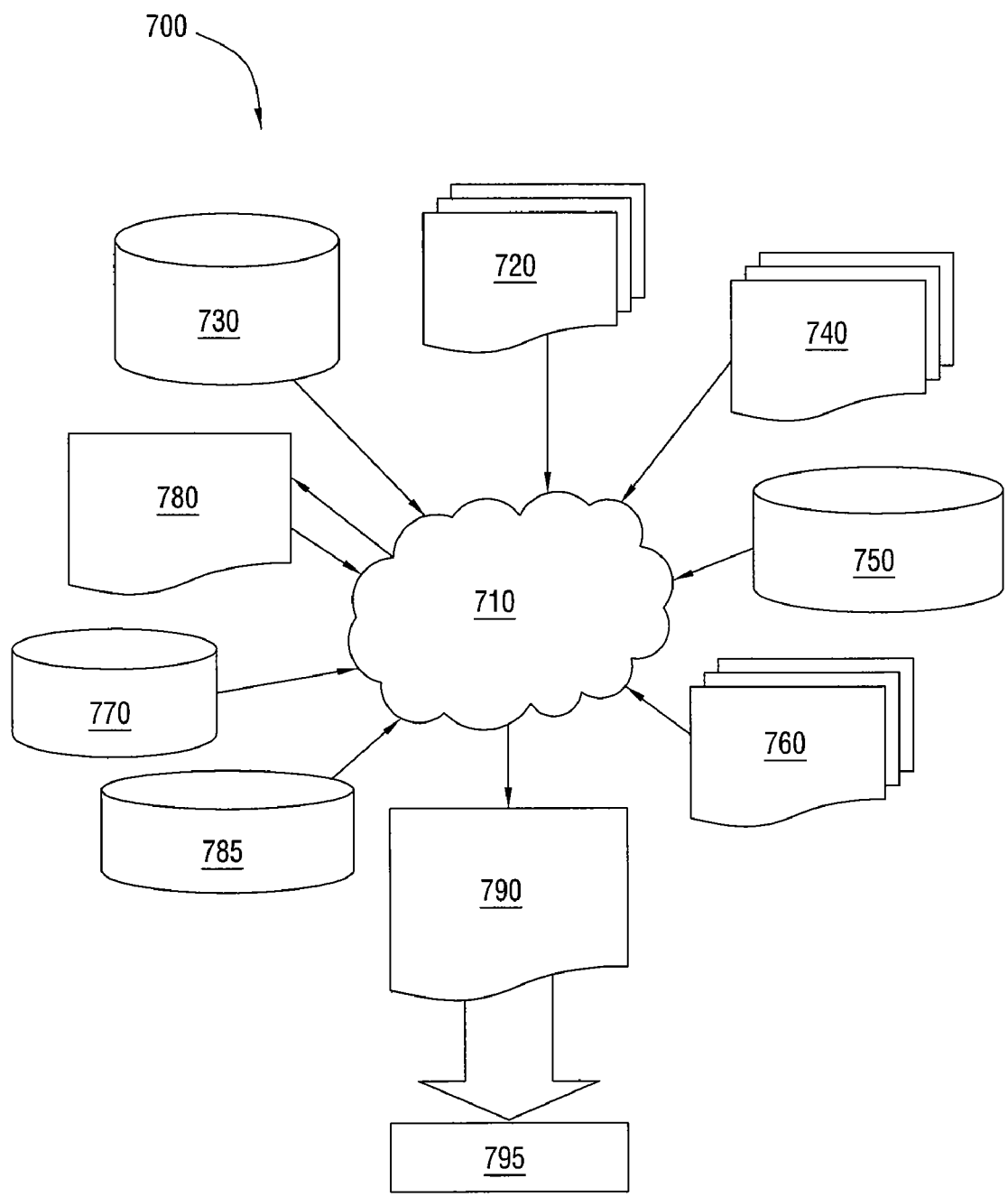
FIG. 7 is a flow diagram of a design process used in semiconductor design, manufacture, and/or test.

FIG. 7 shows a block diagram of an exemplary design flow 700 used for example, in semiconductor design, manufacturing, and/or test. Design flow 700 may vary depending on the type of IC being designed. For example, a design flow 700 for building an application specific IC (ASIC) may differ from a design flow 700 for designing a standard component. Design structure 720 is preferably an input to a design process 710 and may come from an IP provider, a core developer, or other design company or may be generated by the operator of the design flow, or from other sources. Design structure 720) comprises the circuits described above and shown in FIGS. 1-3 in the form of schematics or HDL, a hardware-description language (e.g., Verilog, VHDL, C, etc.). Design structure 720 may be contained on one or more machine readable medium. For example, design structure 720 may be a text file or a graphical representation of a circuit as described above and shown in FIGS. 1-3. Design process 710 preferably synthesizes (or translates) the circuit described above and shown in FIGS. 1-3 into a netlist 780, where netlist 780 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 780 is resynthesized one or more times depending on design specifications and parameters for the circuit.

Design process 710 may include using a variety of inputs; for example, inputs from library elements 730 which may house a set of commonly used elements, circuits, and devices, including models, layouts, and symbolic representations, for a given manufacturing technology (e.g., different technology nodes, 32 nm, 45 nm, 90 nm, etc.), design specifications 740, characterization data 750, verification data 760, design rules 770, and test data files 785 (which may include test patterns and other testing information). Design process 710 may further include, for example, standard circuit design processes such as timing analysis, verification, design rule checking, place and route operations, etc. One of ordinary skill in the art of integrated circuit design can appreciate the extent of possible electronic design automation tools and applications used in design process 710 without deviating from the scope and spirit of the invention. The design structure of the invention is not limited to any specific design flow.

Design process 710 preferably translates a circuit as described above and shown in FIGS. 1-3, along with any additional integrated circuit design or data (if applicable), into a second design structure 790. Design structure 790 resides on a storage medium in a data format used for the exchange of layout data of integrated circuits (e.g. information stored in a GDSII (GDS2), GL1, OASIS, or any other suitable format for storing such design structures). Design structure 790 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1-3. Design structure 790 may then proceed to a stage 795 where, for example, design structure 790: proceeds to tape-out, is released to manufacturing, is released to a mask house, is sent to another design house, is sent back to the customer, etc.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A design structure embodied in a non-transitory machine readable storage medium for at least one of designing, manufacturing, and testing a design, wherein when executed by a processor, the design structure implements the design comprising:
a memory subsystem having a plurality of buffer chips configured for retrieving memory data from memory components connected thereto; and
a memory controller associated with the memory subsystem, the memory controller comprising:
logic for scheduling a next data request among one or more received data requests for execution at a next scheduling cycle based on a comparison of binary return time vectors corresponding to the one or more received data requests with a history vector corresponding to currently executing data requests, wherein the next data request does not present a data bus conflict to the currently executing data requests.

2. The design structure of claim 1, further comprising:
logic for ORing the binary return time vector corresponding to the next data request with the history vector; and
logic for updating the history vector by (a) removing an element within the history vector that corresponds to a completed data request and (b) adding a new element within the history vector that corresponds to the next data request.

3. The design structure of claim 2, further comprising logic for removing an expired element from the history vector.

4. The design structure of claim 1, further comprising
logic for pre-computing return time information indicating access latencies associated with retrieving memory data stored within memory components connected to respective buffer chips among the plurality of buffer chips.

5. The design structure of claim 4, wherein the logic for pre-computing further comprises logic for calculating the return time information in a unit of time.

6. The design structure of claim 4, wherein the logic for pre-computing further comprises logic for expressing the return time information as a plurality of binary return time vectors with a single bit turned on.

7. The design structure of claim 6, wherein the logic for pre-computing further comprises storing the plurality of binary return time vectors in a table of return time information.

8. The design structure of claim 6, further comprising logic for retrieving a binary return time vector among the plurality of binary return time vectors for a newly received data request.

9. The design structure of claim 1, further comprising
logic for determining whether a newly received data request presents a data bus conflict to the currently executing data requests.

10. The design structure of claim 1, wherein the logic for scheduling further comprises:
logic for identifying one or more data requests among the one or more received data requests that have a lowest score and that present no data bus conflict to the currently executing data requests.

11. The design structure of claim 10, wherein the logic for identifying further comprises:
upon determining that there is one identified data request, selecting the identified data request as the next data request; and
upon determining that there is more than one identified data request, selecting the oldest identified data request as the next data request.

12. The design structure of claim 1, further comprising a netlist that describes the memory controller.

13. The design structure of claim 1, wherein the design structure resides on the non-transitory machine readable storage medium as a data format used for an exchange of layout data of integrated circuits.

14. The design structure of claim 1, wherein the logic for scheduling further comprises logic for computing a vector of sums from the binary return time vectors corresponding to the one or more received data requests.

15. The design structure of claim 14, wherein the logic for scheduling further comprises logic for computing a score for each of the one or more received data requests based on the vector of sums.

* * * * *